Dec. 23, 1924.　　　　　　　　　　　　　　　1,520,550
A. A. PECK
REPAIR DEVICE FOR PNEUMATIC TIRES
Filed May 2, 1924

A. A. Peck,
Inventor

By Clarence A. O'Brien
Attorney

Patented Dec. 23, 1924.

1,520,550

UNITED STATES PATENT OFFICE.

ALVAH A. PECK, OF UNDERWOOD, NORTH DAKOTA.

REPAIR DEVICE FOR PNEUMATIC TIRES.

Application filed May 3, 1924. Serial No. 710,541.

*To all whom it may concern:*

Be it known that I, ALVAH A. PECK, a citizen of the United States, residing at Underwood, in the county of McLean and State of North Dakota, have invented certain new and useful Improvements in Repair Devices for Pneumatic Tires, of which the following is a specification.

This invention relates to new and useful improvements in patches for repairing pneumatic tires, and has for its principal object to provide a repair device, which is adapted to be inserted within the tire casing and will extend around the inner tube positioned therein, for the purposes of covering a blow out, and to further strengthen weakened or broken outer casings of pneumatic tires.

One of the important objects of the present invention is to provide a repair device of the above mentioned character, which is capable of being applied easily and quickly in position, and will not slip or move after the same has been placed around the inner tube within the outer casing.

A further object is to provide a repair device of the above mentioned character, wherein the same is provided with means for engagement with the beads of the outer casing, for securing the repair device in position.

A still further object is to provide a repair device of the above mentioned character which is simple in construction, inexpensive, strong and durable and further well adapted for the purposes for which it is designated.

Other objects and advantages of this invention will become apparent during the course of the following description.

Figure 1:
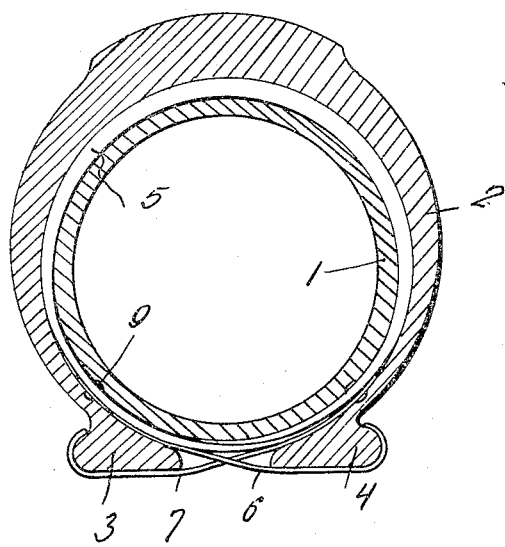
Figure 2:
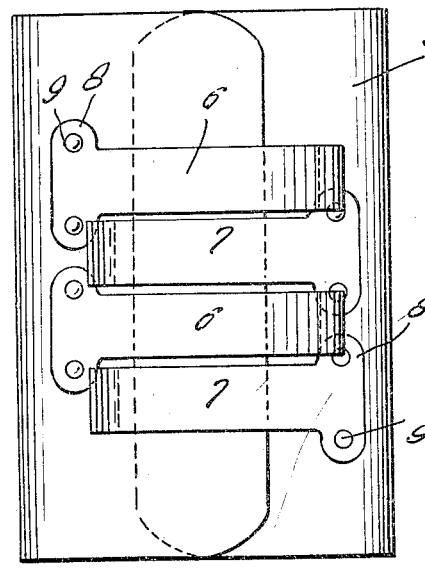

In the accompanying drawing, forming a part of this specification, and in which like numerals designate like parts throughout the same:

Figure 1 is a cross sectional view of a pneumatic tire, showing my invention in position thereon, and Figure 2 is a bottom plan view of my repair device.

In the drawing, wherein for the purpose of illustration is shown the preferred embodiment of my invention, the numeral 1 designates the inner tube, and the numerals 2 designates the outer casing, in which the inner tube is normally disposed. The beads of the outer casing, are designated by the numerals 3 and 4 respectively. My repair device comprises a body portion 5, which is formed of a plurality of laminations of canvas and rubber, in the manner well known in the art, and it is not thought necessary to further go in detail relative to the same. The body portion 5 is of a suitable length, and the longitudinal edges thereof are reduced, and are further adapted to overlap each other, in the manner as clearly shown in Figure 1 of the drawing. The body portion 5 is further adapted to be interposed between the inner tube and the outer casing, so that the same will extend entirely around the inner tube, at the portion where the outer casing has been cut or weakened.

For the purpose of securing my repair device in position in the casing, around the inner tube, so as to prevent the accidental slipping of the repair device on the inner tube, I provide the attaching hooks, such as are shown, at 6 and 7 respectively, in the drawing. These hooks have their inner ends provided with ears, shown at 8, and through which is adapted to extend, fastening means, shown at 9. The latter may be of any conventional construction, such as rivets or the like, and I do not wish to limit myself to the particular manner in which the hooks are to be fastened to the repair device.

The hooks 6 are secured to the outer face of the body portion adjacent one of the longitudinal edges thereof, while the hooks 7 are secured to the outer face of the body portion adjacent the opposite longitudinal edge thereof. The hooks are furthermore so arranged as to alternate with each other, in the manner as clearly shown in Figure 2 of the drawing, and this construction enables the hooks 6 to have their free ends engaging the bead 4 of the casing 2, while the free ends of the hooks 7 are in engagement with the bead 3 of the casing, in the manner as clearly shown in Figure 1.

In this manner, the repair device will be securely held in position within the tire casing around the inner tube against accidental displacement and will not cause the pinching of the tube or the removal of the tire repair device from the position where it was initially secured. The simplicity of my device enables the same to be easily and quickly placed in position whenever necessary, and will be further strong and durable, as well as prolong the life of the outer casing, without causing any injury to the inner tube.

While I have shown the preferred embodiment of my invention, it is to be understood that various changes in the size, shape, and arrangement of parts may be resorted to, without departing from the spirit of the invention, and the scope of the appended claims.

Having thus described my invention, what is claimed is:

1. A repair device for pneumatic tires comprising a body portion adapted to be interposed between the inner tube and the outer casing of said tire, the free longitudinal edges of the body portion overlapping each other, and alternately arranged hooks secured to the body portion adjacent the longitudinal edges thereof, and adapted to engage the opposite beads of said casing.

2. A repair device for pneumatic tires comprising a body portion adapted to be disposed within the tire casing and around the inner tube of said tire, the longitudinal edges of the body portion tapering and overlapping with each other, and alternately arranged hooks secured at their inner ends to the body portions adjacent the longitudinal edges thereof, the free ends of said hooks adapted to engage the opposite beads of said casing.

In testimony whereof I affix my signature.

ALVAH A. PECK.